United States Patent [19]
Rose, Jr. et al.
[11] 3,834,648
[45] Sept. 10, 1974

[54] APPARATUS AND METHOD FOR SENSING DIAMETER OF TAPE PACK ON STORAGE REEL

[75] Inventors: Marshall G. Rose, Jr., Milpitas; Harold V. Clark, Palo Alto, both of Canada
[73] Assignee: Ampex Corporation, Redwood City, Calif.

[22] Filed: Mar. 15, 1972
[21] Appl. No.: 234,758

[52] U.S. Cl. ........ 242/186, 235/92 CA, 235/92 CT, 235/92 DN, 235/150.1, 242/57, 242/75.51, 242/191, 340/146.2
[51] Int. Cl. ... B65h 25/00, G11b 15/32 G06m 1/272
[58] Field of Search ............ 2/186, 190, 191, 75.51, 2/75.45, 75.47, 57; 235/151.32, 92 CA, 92 DN; 340/146.2, 174.1 K

[56] References Cited

UNITED STATES PATENTS

| | | | |
|---|---|---|---|
| 3,151,507 | 10/1964 | Canova et al. | 242/75.51 X |
| 3,214,110 | 10/1965 | Ross | 242/75.51 X |
| 3,248,621 | 4/1966 | Carter et al. | 242/75.51 X |
| 3,290,647 | 12/1966 | Joseph et al. | 340/146.2 |
| 3,518,857 | 7/1970 | Hancock et al. | 242/57 X |
| 3,553,992 | 1/1971 | Harbaugh | 242/75.51 X |
| 3,564,219 | 2/1971 | Mutziger | 235/151.32 X |

*Primary Examiner*—John W. Huckert
*Assistant Examiner*—John M. Jillons

[57] ABSTRACT

An end of tape sensor for sensing the approaching end of a supply of magnetic tape on a storage reel on a tape transport and for producing a control signal for controlling the tape drive means includes a feed tachometer means for detecting longitudinal tape speed, reel tachometer means for detecting reel rotational speed, digital counter means responsive to said feed and reel tachometer means for developing a digital signal representing the ratio of longitudinal tape speed to reel rotational speed, a tape pack diameter selector for producing a preselected digital ratio of longitudinal tape speed to reel rotational speed corresponding to a desired terminal tape pack diameter and digital comparator means for comparing said digital signal with said preselected digital ratio, said comparator including a storage register which produces a control signal to control said tape drive means when said digital signal and said preselected digital ratio achieve a plurality of matches in succession.

6 Claims, 1 Drawing Figure

PATENTED SEP 10 1974 3,834,648
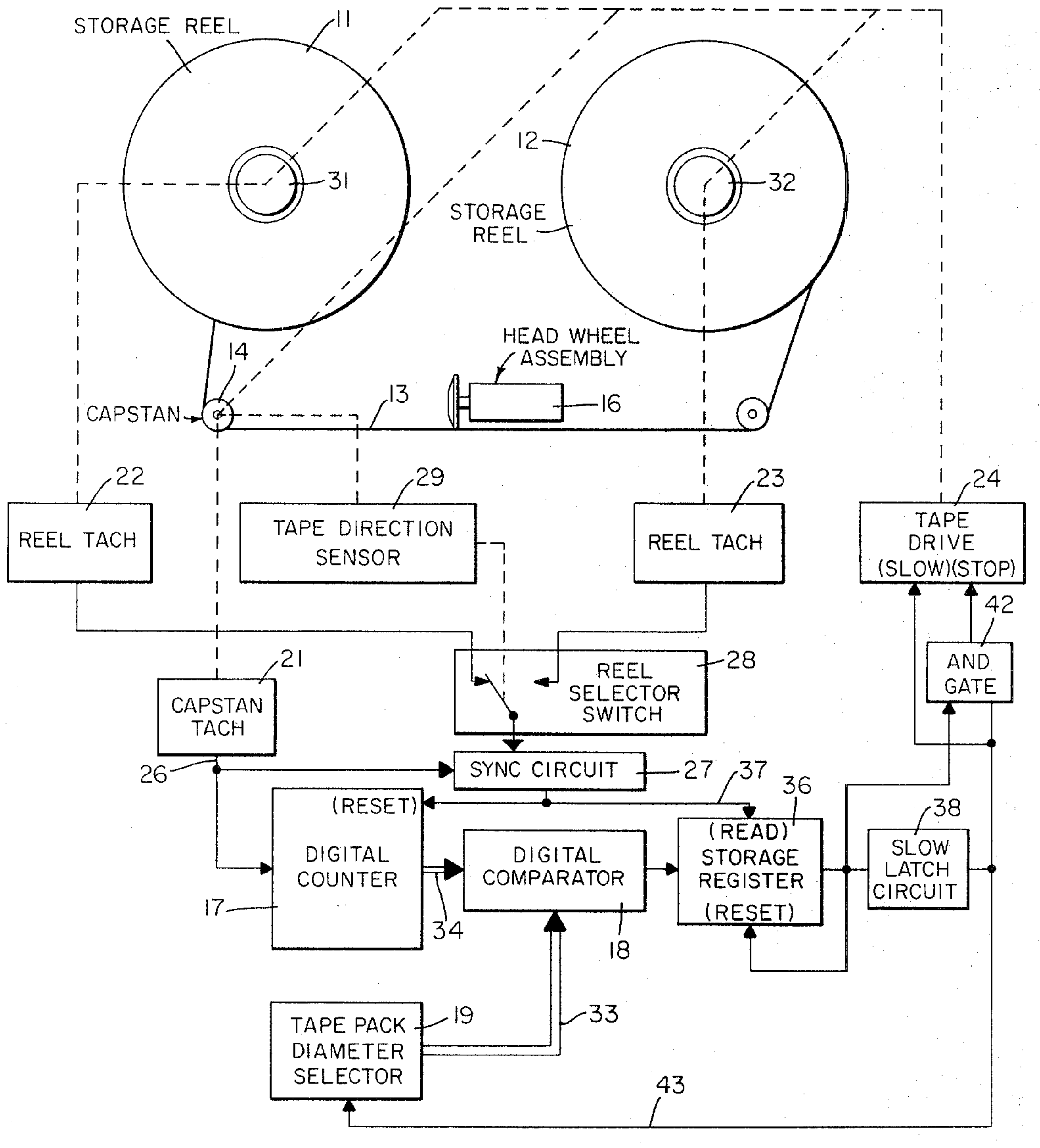

APPARATUS AND METHOD FOR SENSING DIAMETER OF TAPE PACK ON STORAGE REEL

In general, the present invention relates to methods and apparatus for detecting the amount of elongate material wound on a storage reel, and, in particular, relates to apparatus for sensing the end-of-tape condition on a magnetic tape transport and for controlling the slowdown and stoppage of tape movement.

It is desirable in many instances to provide a means for determining the quantity of material carried by a storage reel. In the case of a magnetic tape transport for example, the size of the tape pack remaining on the supply reel represents the amount of recording or playback time remaining.

With particular relevance to the present invention, one specific application of such means involves situations where it is necessary or desirable to automatically stop the tape transport as the quantity of tape remaining on a reel approaches an end and prior to the tape running off the reel. It should be observed that a variety of means have been provided for sensing an approach to "end-of-tape" and automatically terminating the tape motion. For example, prepared tapes and electro-optical techniques are typically employed for this purpose. However, preparing tapes with markers or the like has been found time consuming and generally troublesome, while electro-optical means have been lacking in accuracy.

Accordingly it is an objective of the present invention to provide an extremely accurate detection of the remaining tape or material on a storage reel, particularly for sensing an approach to "end-of-tape."

It is a further objective of the invention to provide an accurate detection means without requiring advance preparation of the tape.

These and other objectives, features and advantages of the invention will be more fully understood by reference to the following comprehensive disclosure, including the accompanying Drawing.

With reference to the Drawing, a pair of storage reels 11 and 12 are illustrated, each carrying stored portions or partial packs of a magnetic tape material 13. Tape material 13 is guided between storage reels 11 and 12 by means of a capstan drive 14 such that the tape passes a magnetic recording transducer means, in this instance a video recording transducer in the form of a rotating magnetic head wheel assembly 16. In accordance with the present invention, the amount of material, i.e., the diameter of the tape pack carried by each of reels 11 and 12 is sensed by developing a digital signal within a digital counter 17 representing, preferably, the ratio of the rate of longitudinal tape movement to the rate of reel rotation. It should be noted that the inverse ratio, the ratio of the rate of reel rotation to the rate of longitudinal tape movement could also be determined but hardware capacity would necessarily be greater since near the end-of-tape condition the ratio would then be getting large rather than small. This digital signal is thereupon compared in a digital comparator 18 with a predetermined reference digital signal developed by tape pack diameter selector 19, wherein the latter signal has been correlated to a known diameter of reel tape pack. As discussed more fully herein, an electro-mechanical capstan tachometer 21 provides the measurement of longitudinal tape rate while electro-mechanical reel tachometers 22 and 23 provide a measured representation of the reel rotation rates. In the disclosed and preferred embodiment of the invention, the system is structured to detect an approach to the "end-of-tape" on either of reels 11 and 12 and to thereupon cause a tape drive 24 to terminate tape and reel motion.

In operation, capstan 14 drives tape 13 in one of two directions in response to tape drive 24 and storage reels 11 and 12 are rotated to accommodate the winding or unwinding of tape thereon. Capstan tachometer 21 in response to rotation of capstan 14 generates an electrical pulse signal in which the frequency of pulses is representative of the rate of longitudinal tape motion. This representative rate signal is issued at output 26 and is jointly fed to digital counter 17 and a synchronizing circuit 27, the purpose of which will be explained herein. Counter 17 thus responds to each incoming pulse developed by tachometer 21 and advances in counting state. Concurrently, and depending on the direction of tape movement one of reel tachometers 22 and 23 issues a train of electrical pulses, having a frequency representing the rotational rate of the reel, to synchronizing circuit 27 through a reel selector switch 28. Synchronizing circuit 27 adjusts the relative phase of the incoming reel tachometer pulse signal such that it occurs at a known time relative to the capstan tachometer pulses to avoid ambiguity in the switching operation of digital counter 17. The output of synchronizing circuit 27 is fed to a reset input of counter 17 such that the counter registers a number of input pulses from capstan tachometer 21 during the time interval corresponding to consecutive reel tachometer pulses, the counter being "reset" following each reel rate pulse. The relative frequencies of the output signals issued by tachometers 21, 22, and 23 can be, of course, adjusted to provide appropriate measure of relative rates involved. Such adjustment merely requires recalibration of the digital reference signal generated by tape pack diameter selector 19.

In the presently disclosed and preferred embodiment, the ratio of rates developed by counter 17 is provided by only one of the storage reels 11 and 12 at a time. More particularly, the rotational rate of the reel from which tape 13 is being removed is fed into the synchronizing circuit 27 and from there to the digital counter 17. A tape direction sensor 29 serves to sense the rotational direction of capstan 14, by means well known to those skilled in the art, and controls the position of reel selector switch 28 so as to pass the tachometer pulse train developed by the one of reel tachometers 22 and 23 which corresponds to the reel from which tape is being unwound. As the present invention is advantageously used in the disclosed embodiment to obtain an advance warning that the tape is approaching an end, it is preferable to use rotational rate information of the reel from which tape is being removed. In this way the ratio of longitudinal speed to reel rotational speed is correlated to a particular tape pack diameter which is slightly larger than the known diameter of hubs 31 and 32. When the measured ratio of rates developed on counter 17 matches the predetermined ratio of rates represented by the output signal of circuit 19, then it is known that the diameter of the tape pack has reached a predetermined amount.

For example, assuming that tape 13 is being withdrawn from storage reel 11 and stored on reel 12, tape direction sensor 29 causes selector switch 28 to pass the information developed by reel tachometer 22 through synchronizing circuit 27 causing counter 17 to periodically register a digital number or signal representing the ratio of the longitudinal speed of tape 13 to the rotational speed of reel 11. Prior to this, a preselected digital word is generated by selector 19 and fed over connection 33 to comparator 18. The digital word on counter 17 is passed over connection 34 to comparator 18. If the amount of tape on reel 11 decreases to or goes below a level represented by a selector 19, digital comparator 18 senses a match between the two input digital words and uses an output pulse signal indicating such match to a storage register 36. Storage register 36 is read at a time synchronized to the output pulse train of one of reel tachometers 22 and 23 by means of a line 37 connected from circuit 27 to a read input of register 36. Storage 36 is provided with a plurality, for example four storage states, and serves to detect a plurality, in this instance four consecutive matches at the output of digital comparator 18 before passing this information onto and for controlling tape drive 24. By requiring in this instance four consecutive matches between digital words developed by counter 17 and selector 19, spurious matches caused, for example, during acceleration of the tape drive, are passed over.

While the initial detection of a match is in this embodiment employed to first slow the transport down, comparator 18 may be connected, if desired, to effect an immediate deceleration of the tape movement culminating in a complete stoppage thereof. The initial deceleration from a high speed mode, e.g., rewind, is achieved by the circuitry shown to connect storage register 36 to tape drive 24 and by providing at least two modes for selector 19, each mode generating a different predetermined digital signal over connection 33. In particular, selector 19 is initially disposed in a first mode in which it generates a first digital signal representing a preselected diameter of the remaining tape pack. During removal of tape 13 from reel 11, an initial match is registered by comparator 18 with the first mode digital signal from selector 19. Four consecutive such matches are detected by register 36 causing the register to issue an output signal to a slow latch circuit 38 and to one input of an AND gate 42. The output of latch circuit 38 changes state and remains in its changed condition causing a signal to be issued to the slow input of tape drive 24, decelerating the tape to a predetermined constant speed which is preferably relatively slower than the normally high rewind speed of the recorder. Simultaneously circuit 38 at the output thereof issues a signal over line 43 to selector 19 disposing selector 19 in a second mode. Selector 19 now issues a different digital reference signal to comparator 18, in this instance a signal representing a tape pack diameter at which it is desired to stop the transport operation completely. The second mode signal is thus repeatedly compared by comparator 18 with the digital signal on counter 17 as the tape pack diameter on reel 11 approaches the stop point. After four consecutive matches by the register, register 36 issues still another output signal which is fed to the remaining input of gate 42. The first input of this gate is disposed in an enabled condition, by means of the output of circuit 38, such that the succeeding signal from register 36 causes AND gate 42 to issue a control signal to the stop control of tape drive 24 which in turn terminates rotation of reels 10 and 11 and capstan 14.

Using this system, it has been found possible to detect a diameter of reel pack leaving only 10 turns of tape on the hub of the reel. Magnetic tape thickness is typically on the order of one to two mils and the diameter of a video tape reel hub such as hubs 31 and 32 is on the order of 4 to 5 inches. Thus, it will be appreciated that the present invention provides for a detection of a difference in diameter of around 20 mils out of the 4 to 5 inches corresponding to the hub diameter.

One of the operating conditions of the present invention is that the hubs of the various tape reels used on the transport have the same diameter. If the hub diameter does change, depending upon the reels used, then unless suitable adjustments are made in tape pack diameter selector 19, the circuitry may function to leave a greater number of turns on the hub than desired or it may run the tape off the reel. This can be easily remedied by providing operator adjustable means in conjunction with selector 19 so that the digital word or words generated thereby are readily correlated to the particular reels in use.

What is claimed is:

1. An apparatus for sensing the approaching end of a supply of magnetic tape on a first storage reel when the tape is being transferred on a tape transport to a second storage reel and including, tape drive means responsive to a tape drive control signal, feed and reel tachometer means for generating trains of pulses representative respectively of the longitudinal speed of the magnetic tape and the instantaneous rotation speed of the storage reels, and digital counter means, the apparatus comprising:

direction sensing and switching means operatively coupled to the tape for detecting the instantaneous direction of travel thereof and responsive to the tape to operatively couple the digital counter means to the reel tachometer means of the reel which is approaching the end-of-tape condition;

a synchronizing circuit coupled to the direction sensing and switching means and to the feed tachometer means for adjusting the phase of the reel tachometer pulses relative to the feed tachometer pulses;

said digital counter means being responsive to said feed and reel tachometer means for developing a digital signal representing a ratio of said longitudinal tape speed to said reel rotational speed;

tape pack diameter selector for producing a preselected stop digital word representing a desired ratio of longitudinal tape speed to reel rotational speed corresponding to a preselectable terminal tape pack diameter;

digital comparator means coupled to the diameter selector and to the digital counter means for comparing said digital signal with said preselected stop digital word; and circuit means including a storage register responsive to the comparator means and to the synchronizing circuit to produce a control signal to stop said tape drive means when said digital signal matches said preselected stop digital word for a plurality of matches in succession.

2. The apparatus of claim 1 wherein said tape pack diameter selector produces an additional preselected slow digital word prior to producing said preselected stop digital word, said slow digital word corresponding to a tape pack diameter at which said magnetic tape is slowed down prior to shutoff; and said circuit means produces a preliminary control signal to slow down said tape drive means when said digital signal and said additional preselected slow digital word achieve a plurality of matches in succession.

3. The apparatus of claim 2 wherein each of said plurality of matches is greater than three.

4. The apparatus of claim 2 wherein said tape drive means includes a normal drive mode, a slow drive mode and a stop mode, and the combination is further defined by said tape pack diameter selector having a first mode in which the preselected slow digital word is generated and a second mode in which the preselected stop digital word is generated, said storage register of the circuit means being responsive to the output signals of said comparator means and said synchronizing circuit to indicate the plurality of successive matches between the signal developed on said digital counter means and the preselected slow digital word to dispose said tape drive means in said slow drive mode, and further responsive thereafter to the output signals of said comparator means and synchronizing circuit to indicate the plurality of successive matches between the signal developed by said digital counter means and the preselected stop digital word to dispose said tape drive means in said stop mode.

5. The apparatus of claim 4 wherein the circuit means further includes, a slow latch circuit which changes state in response to the consecutive matches generated via the storage register to switch the tape drive means to the slow drive mode, said slow latch circuit simultaneously switching the tape pack diameter selector into the second mode to allow the latter to then develop the preselected stop digital word.

6. The apparatus of claim 5 wherein the slow latch circuit includes an AND gate, and the storage register is read in synchronization with the pulse train from a reel tachometer means in response to the synchronizing circuit to produce the consecutive matches during both the slow drive and the stop modes, wherein the AND gate is enabled during the stop mode to terminate operation of the tape drive means.

* * * * *